Jan. 23, 1940. F. S. WHITE ET AL Re. 21,334

CHECK VALVE

Original Filed Feb. 21, 1934

INVENTORS:
Forrest S. White
Claude G. Bordeaux
By
ATTORNEYS

Reissued Jan. 23, 1940

Re. 21,334

UNITED STATES PATENT OFFICE 21,334

CHECK VALVE

Forrest S. White, Hoosick Falls, and Claude G. Bordeaux, Albany, N. Y.

Original No. 2,068,833, dated January 26, 1937, Serial No. 712,372, February 21, 1934. Application for reissue May 11, 1938, Serial No. 207,322

4 Claims. (Cl. 137—69)

Our invention more particularly relates to a check valve which is easy to manufacture, in expensive, easily installed and satisfactory in operation.

Check valves as ordinarily manufactured are mounted on an internal partition which is integral with the housing with which the valve is used. The parts are cast and the seat for the valve is comparatively rough and must be ground. Inasmuch as the seat is within the housing, an opening is provided through which the handle of a tool may be inserted for grinding the valve and a second opening through which the tool itself may be inserted in place and removed.

In accordance with our invention an insert is provided with a passage and a seat and a valve member are mounted on the insert for closing the passage, the insert being readily removable from the housing or union.

Our invention will best be understood by reference to the accompanying drawing in which—

Like reference characters indicate like parts throughout the drawing.

Figure 5:
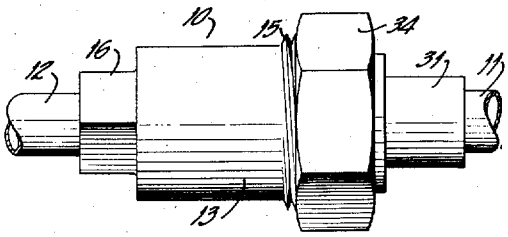
Fig. 5 is a side elevation showing the check valve and the pipes connected thereto in assembled relation.

Referring first to Fig. 5, 10 indicates generally a check valve embodying our invention to which the ends of two pipes 11 and 12 are shown connected. The check valve comprises a housing 13 open at one end and provided at said end with a peripheral seat 14 which may conveniently be conical in form. The major portion of the housing 13 is preferably generally cylindrical in form and is externally threaded at one end as at 15 while the opposite end thereof is preferably contracted as at 16 and provided with a threaded opening 17 for the reception of the threaded end of pipe 12.

An insert indicated generally at 18 is provided with a body portion 19 formed with a seat 20 which engages the seat 14 on the end of the housing and which is adapted to form a fluid tight joint therewith. The body portion of the insert is preferably generally cylindrical in form but the inner end thereof is inclined as at 21 to the plane of the seat 20, preferably at an angle of about 45 degrees. The insert 18 is provided with a passage 22 communicating with the end thereof which is formed with a seat and with the inclined face 21. A raised seat 23 surrounds the passage 22 and a valve member 24 is engageable with said seat and adapted to close the passage 22. The valve member 24 is mounted on a hinged arm 25 pivoted as at 26 on the insert. A somewhat loose connection is preferably provided between the valve member 24 and the arm 25. In the embodiment illustrated the valve member 24 is provided with a stem 27 extending through an opening 28 in the arm 25, the opening being slightly larger than the stem, and a nut 29 engages the end of the stem 27, the parts being arranged to permit a certain amount of play between the valve member and the arm so that the valve member may accommodate itself to the seat 23 which it engages.

In accordance with our invention means are preferably provided for requiring the insert to be placed in a predetermined position within the housing as a prerequisite to the seat thereof engaging the seat on the housing, and which prevents relative rotation between said insert and said housing.

It will be observed that the successful operation of the valve depends upon its being so positioned, when installed, that it falls by gravity against its valve seat and such operation, in turn, depends upon the housing being properly positioned with respect to the valve. It will further be observed that the valve, when installed, is concealed from view and that in the absence of some means exterior of the housing for indicating when the valve is properly positioned within the housing, any substantial turning movement of the housing when the valve has once been installed would bring the valve to a position where its operation would be unsatisfactory, if not entirely inoperative.

In accordance with our invention, means are provided exterior of the housing which when the valve is correctly positioned with respect to the housing indicate the position of the valve. In the embodiment of my invention illustrated, the contracted portion 16 of the valve housing is square in cross section and the housing is so constructed and arranged that when the housing is in the position illustrated in Figs. 1 and 5, with the lugs 30 in the correct position to permit the insert to be installed properly, one of the edges of such contracted square portion 16 of the housing is on the top of the housing, and that any turning movement of the housing such as might result from screwing the thimble 34 on the opposite end of the housing could be observed by the person installing the valve. When the proper edge of the square portion 16 of the housing points upwardly, therefore, it affords to the user an indication that the housing and the valve therein are in their correct positions.

Figure 4:
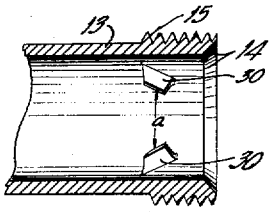
Fig. 4 is an axial section through the upper portion of the housing.

It will be understood that my invention is equally applicable to a vertically disposed pipe as it is evident that when the insert with the valve is installed in a vertically disposed housing, the valve will also fall by gravity against its seat provided the valve is at the upper end of the insert. In the embodiment of our invention illustrated the check valve is assumed to be placed in a horizontal position, and in order that the check valve may function properly, the valve member should swing upwardly away from the valve seat 23. The inclined face 21 of the body member should, therefore, incline upwardly and rearwardly from the tapered end thereof towards the seat of the insert. The housing 13 is provided with two inwardly extending lugs 30, between which are unequal spaces peripherally of the housing as will be evident from Fig. 4 which is a sectional view taken through the axis of the housing. It is evident that the space *a* between the lugs at one side of the housing is less than 180 degrees and that the space between these lugs on the opposite side of the housing is correspondingly more than 180 degrees. The lugs 30 are also arranged at the desired distance from the open end of the housing so that when the insert 18 is received between the wider spacing of the lugs 30, the seat 20 thereof will engage the peripheral seat 14 on the end of the housing, and the forward inclined face of the body portion 19 of the insert engages the lugs 30 on the housing thereby preventing relative rotation between the insert and the housing.

Figure 1:
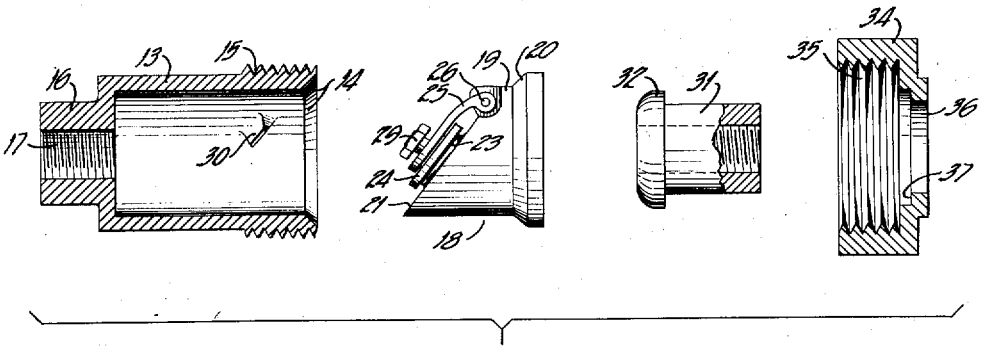
Fig. 1 is an exploded or disassembled view, partially in section, illustrating the parts of the check valve embodying our invention.
Figure 2:
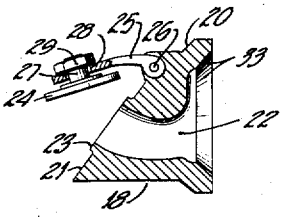
Fig. 2 is a sectional view through the insert.
Figure 3:
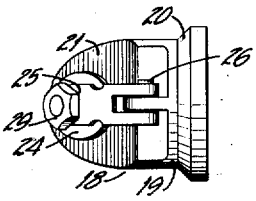
Fig. 3 is a plan view of Fig. 2.

Our check valve also comprises a pipe union 31 which is provided at its inner end with a peripheral flange 32 which is preferably rounded on its outer face as indicated in Fig. 1 and forms a line contact and a fluid tight engagement with a seat 33 preferably conical in shape which is formed on the end of the insert 18.

A member 34 which may be termed a spanner nut or cap is provided with a flange 35 screw threaded on its interior and adapted to engage the screw threads 15 on the housing 13 and is provided with an opening 36 through which the pipe union 31 extends. When the cap 34 is screwed home on the housing 13, a shoulder 37 thereon engages the flange 32 on the pipe union and forces the same into fluid tight engagement with the seat 33 of the insert 18, and the seat 20 on the latter is in turn forced into fluid tight engagement with the seat 14 on the housing 13.

It will be noted that the housing 13 and the insert 18 are self centered by the engagement of the conical valve seats 20 and 14, and that the member 34 and the pipe union 31 are self centered by the engagement of the main body of the pipe union with the walls surrounding the opening 36 and the engagement of the periphery of the flange 32 of the pipe union against the shoulder 37 within the recess surrounding the opening 36 in member 34. The axes of the two parts, therefore coincide and when brought together the rounded forward end of the pipe union forms an annular line contact with the conical seat 33 of the insert.

Our invention also provides a novel form of pipe union. By providing interengageable conical seats 14 and 20 on the housing 13 and the insert 18, respectively, the two parts are self centered when brough together, and by providing an opening 36 in the spanner nut 34 in which the main body portion of the pipe union 31 is received and a shouldered recess surrounding said opening in which the flange 32 on the end of the pipe union is received, the pipe union and the spanner nut are self centered and their axis coincides with the axis of the housing and the insert and the forward rounded end of the pipe union form an annular line contact and a fluid tight joint with the conical seat of the insert with which it engages when the parts are assembled.

It will be apparent that the device embodying our invention is not only comparatively inexpensive, as practically all the parts may be made on an automatic screw machine, but is easy of manufacture since the seat 23 is readily accessible for grinding purposes and the valve member is also readily accessible for the mounting of the valve member thereon. The labor required is very much less, therefore, than is required in the case of the ordinary check valve. Furthermore any repairs that are necessary on the check valve during the operation of the device may readily be made. The insert may readily be removed by withdrawing the cap 34 and then moving the pipe union 31 laterally from the insert when the insert may be withdrawn from its housing and any desired repairs may readily be made thereon.

While we have described our invention in its preferred embodiment, it is to be understood that the words which we have used are words of description and not of limitation. Hence, changes within the purview of the appended claims may be made without departing from the true scope and spirit of our invention in its broader aspects.

What we claim is:

1. In a check valve, a housing open at one end, said end being provided with a peripheral seat, an insert provided with a body portion formed at one end with a seat engageable with that of said housing, said body portion being substantially cylindrical in cross section but with a face inclined to the plane of said seat, said insert being provided with a passage communicating with said end thereof and with said inclined face and with a valve seat and a valve member mounted thereon adapted to close said passage, said housing being provided with two inwardly extending lugs, the spaces between which are unequal peripherally of said housing, said lugs being engageable with said body portion, the spacing of said lugs from the end of said housing and peripherally thereof, being such as to permit said insert to seat against said housing when said insert engages said lugs and is received within the wider space between the two.

2. In a check valve, a horizontally extending housing open at one end, said end being provided with a peripheral seat, an insert comprising a body portion provided with a longitudinally extending passage and provided with a first seat engageable with the seat on said housing, said body portion being provided with a valve seat inclined upwardly and rearwardly from the lower tapered end of said body portion towards said first seat thereon when said insert is in operative position in said housing, a valve hinged at its upper portion to said body portion and engageable with said inclined seat, said housing being provided with two inwardly extending lugs, the spaces between which are unequal peripherally of said housing, said lugs being engageable with said body portion, the spacing of said lugs from the end of said housing and peripherally thereof, being such as to permit said insert to seat against said housing when said insert engages said lugs and is received within the wider space between the two.

3. In a check valve, a horizontally extending housing open at one end, said end being provided with a peripheral seat, an insert comprising a body portion provided with a longitudinally extending passage and provided with a first seat engageable with the seat on said housing, said body portion being provided with a valve seat inclined upwardly and rearwardly from the lower tapered end of said body portion towards said first seat thereon when said insert is in operative position in said housing, a valve hinged at its upper portion to said body portion and engageable with said inclined seat, said housing being provided with two inwardly extending lugs, the spaces between which are unequal peripherally of said housing, said lugs being engageable with said body portion, the spacing of said lugs from the end of said housing and peripherally thereof, being such as to permit said insert to seat against said housing when said insert engages said lugs and is received within the wider space between the two, and means engageable with the open end of said housing and with the body portion of said insert for closing the end of said housing and for retaining said body portion in operative position in the open end of said housing.

4. In a check valve, a valve housing open at one end provided at said end with a peripheral seat, an insert receivable within said housing and comprising a body portion provided with a longitudinally extending passage and having a first seat engageable with said seat on said housing, said body portion being inclined at its end opposite to said first seat, a valve seat surrounding the orifice of said passage at such inclined end, a valve member mounted on the inclined end of said body portion and adapted to fall by gravity against said valve seat when the parts are in correct relative positions, the interior of said housing being provided with means interengageable with the forward inclined end of said insert when the seat on said insert engages said seat on said housing and constructed and arranged to prevent relative rotation between said insert and said housing when said seat on said insert engages said seat on said housing.

CLAUDE G. BORDEAUX.
FORREST S. WHITE.